US010220501B1

(12) United States Patent
Davidson

(10) Patent No.: US 10,220,501 B1
(45) Date of Patent: Mar. 5, 2019

(54) POCKET DOOR REPAIR TOOL

(71) Applicant: George P. Davidson, Royal Oak, MI (US)

(72) Inventor: George P. Davidson, Royal Oak, MI (US)

( * ) Notice: Subject to any disclaimer, the term of this patent is extended or adjusted under 35 U.S.C. 154(b) by 0 days.

(21) Appl. No.: 15/183,624

(22) Filed: Jun. 15, 2016

(51) Int. Cl.

| | |
|---|---|
| ***H02P 27/00*** | (2006.01) |
| ***B25F 5/02*** | (2006.01) |
| ***B25B 21/00*** | (2006.01) |
| ***F21V 33/00*** | (2006.01) |
| ***F21V 23/04*** | (2006.01) |
| ***F21L 4/00*** | (2006.01) |
| *F21Y 101/02* | (2006.01) |

(52) U.S. Cl.
CPC .............. *B25F 5/02* (2013.01); *B25B 21/002* (2013.01); *F21L 4/00* (2013.01); *F21V 23/0414* (2013.01); *F21V 33/0084* (2013.01); *F21Y 2101/02* (2013.01)

(58) Field of Classification Search
CPC ...... B25F 5/02; B25B 21/002; F21V 23/0414; F21V 33/0084; F21L 4/00; F21Y 2101/02
See application file for complete search history.

(56) References Cited

U.S. PATENT DOCUMENTS

| | | | | |
|---|---|---|---|---|
| 4,913,007 | A | 4/1990 | Reynolds | |
| 5,168,780 | A | 12/1992 | Van Gennep | |
| 5,400,681 | A | 3/1995 | Strauch | |
| 5,720,542 | A | 2/1998 | Birge, Jr. et al. | |
| 6,055,887 | A | 5/2000 | Galat | |
| 6,293,172 | B1 | 9/2001 | Smith | |
| 2005/0254912 | A1* | 11/2005 | Skrzynski | B23B 27/007 408/226 |
| 2011/0170312 | A1* | 7/2011 | Parrinello | B25F 5/021 362/577 |
| 2015/0144367 | A1* | 5/2015 | Fruh | B25F 5/006 173/162.2 |

* cited by examiner

*Primary Examiner* — Tracie Y Green

(57) ABSTRACT

A pocket door repair tool for removing a pocket door track and installing a new pocket door track including an illuminated powered screwdriver having a pivotable drill bit.

1 Claim, 4 Drawing Sheets

POCKET DOOR REPAIR TOOL

BACKGROUND OF THE INVENTION

Various types of powered tool drivers are known in the prior art. However, what is needed is a pocket door repair tool for removing a pocket door track and installing a new pocket door track including an illuminated powered screw-driver having a pviotable drill bit holder.

FIELD OF THE INVENTION

The present invention relates to a powered tool driver, and more particularly, to a pocket door repair tool providing an illuminated pivotable drill bit holder.

SUMMARY OF THE INVENTION

The general purpose of the present pocket door repair tool, described subsequently in greater detail, is to provide a pocket door repair tool which has many novel features that result in a pocket door repair tool which is not anticipated, rendered obvious, suggested, or even implied by prior art, either alone or in combination thereof.

To accomplish this, the present pocket door repair tool includes a hollow housing body. The housing body has a front side, a rear side, a top side, a bottom side, a right side, a left side, and a cavity continuously disposed within the housing body. A hollow drill bit holder housing has a right end, a left end, a bottom end, a top end, a front end, a rear end pivotably disposed on the front side of the housing body proximal the top side through the right end and the left end. A magnetic drill bit holder is disposed on the front end of the drill bit holder housing. The drill bit holder is configured to magnetically secure a drill bit thereto. A lockable screw is pivotably attached to the rear end of the ii drill bit holder and the front side of the housing body proximal the bottom side through the right end and the left end. The lockable screw is selectively, releasably lockable into one of a plurality of positions. The locking of the lockable screw into a respective one of the plurality of positions is configured to secure the drill bit holder housing into a respective one of a plurality of angles in a range of up to degrees relative the front side of the housing body.

A battery compartment housing a battery is disposed within the cavity proximal the front side of the housing body. An on-off switch is disposed within the cavity proximal the battery compartment. A light emitting diode is provided to illuminate an area being drilled with the drill bit upon activation of the on-off switch. The light emitting diode has a first end partially disposed within the drill bit holder housing proximal the rear end and a lens through the top end. The light emitting diode, the on-off switch, and the battery are in operational communication with each other.

A flexible driver drive shaft is continuously disposed through the cavity and the drill bit holder housing. The driver drive shaft has a forward end in operational communication with the drill bit and a rearward end operationally engageable to a power driver.

In use, the housing body and the drill bit holder housing are inserted through an area of dry wall in proximity to a pocket door track with the drill bit holder housing in a respective one of a plurality of angles with the on-off switch activated to activate the light emitting diode which, in turn, permits the user to see a screw of the pocket door track in order to insert drill bit into the screw and then loosen or tighten the screw to remove or install the pocket door.

Thus has been broadly outlined the more important features of the present pocket door repair tool so that the detailed description thereof that follows may be better understood and in order that the present contribution to the art may be better appreciated.

BRIEF DESCRIPTION OF THE DRAWINGS

FIGURES

Figure 1:
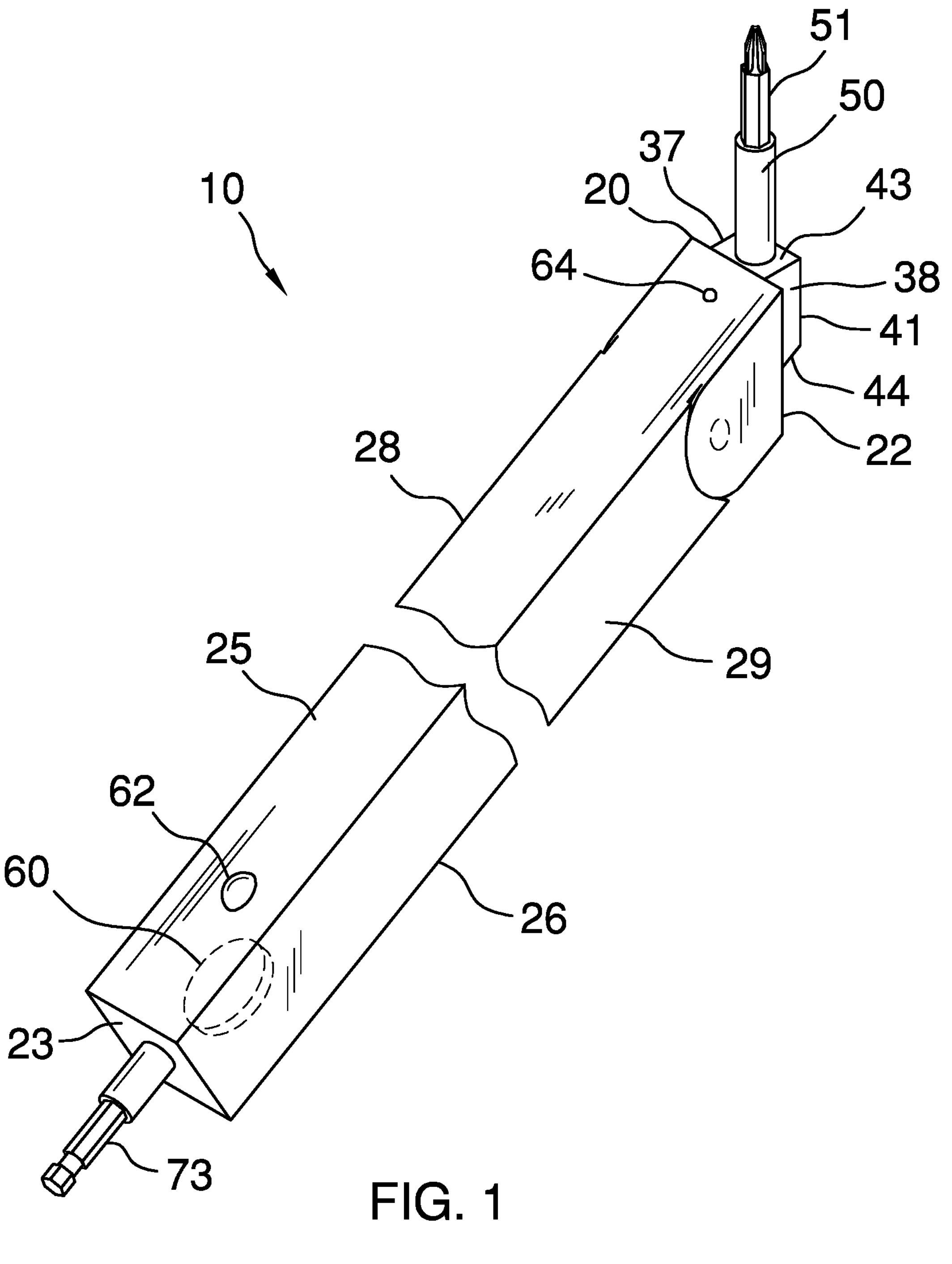

FIG. 1 is a top isometric view.

Figure 2:
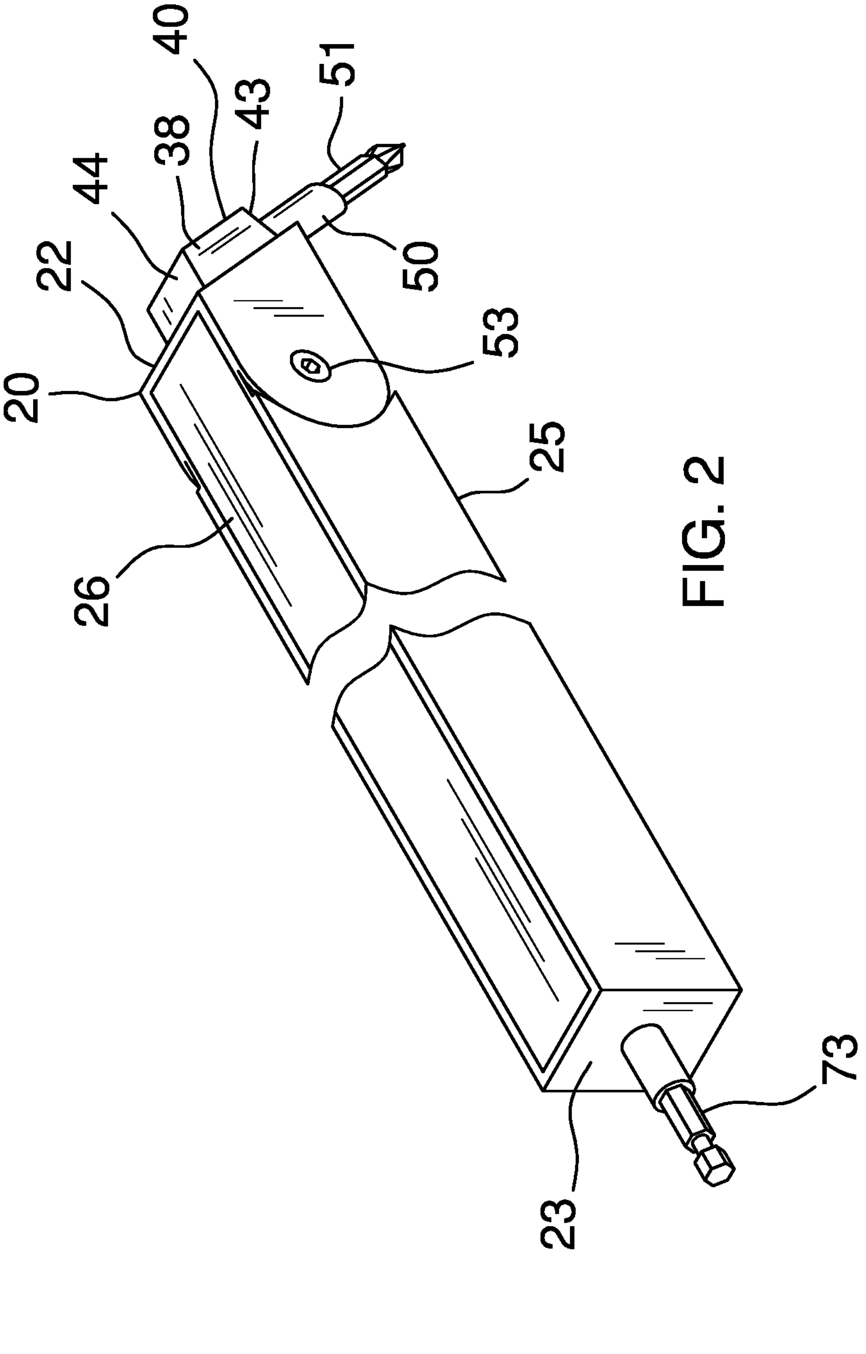

FIG. 2 is a bottom isometric view.

Figure 3:
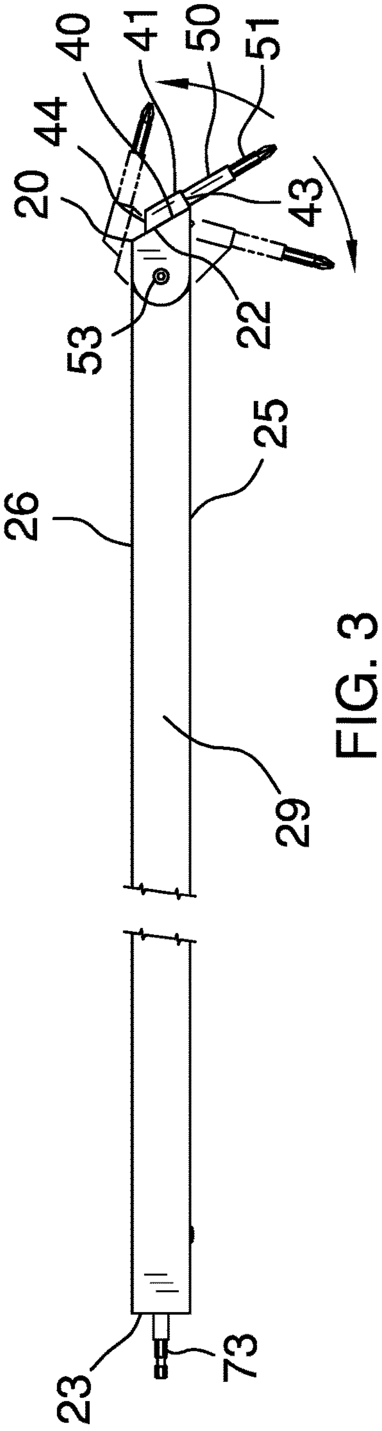

FIG. 3 is a side elevation view.

Figure 4:
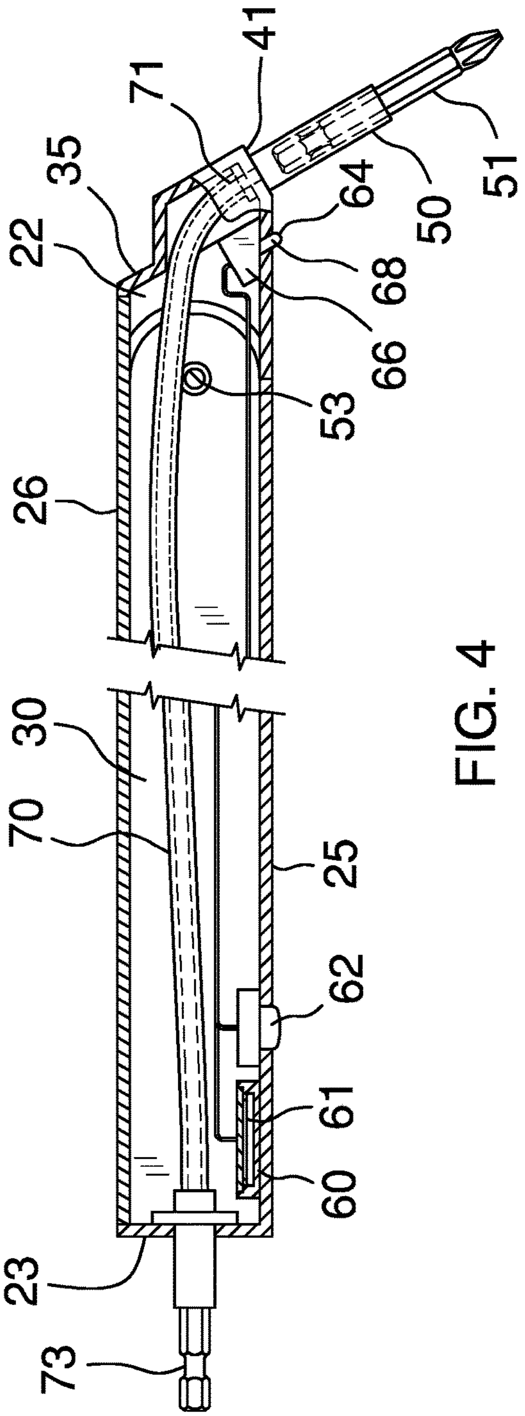

FIG. 4 is a side view with a partial cutaway view.

Figure 5:
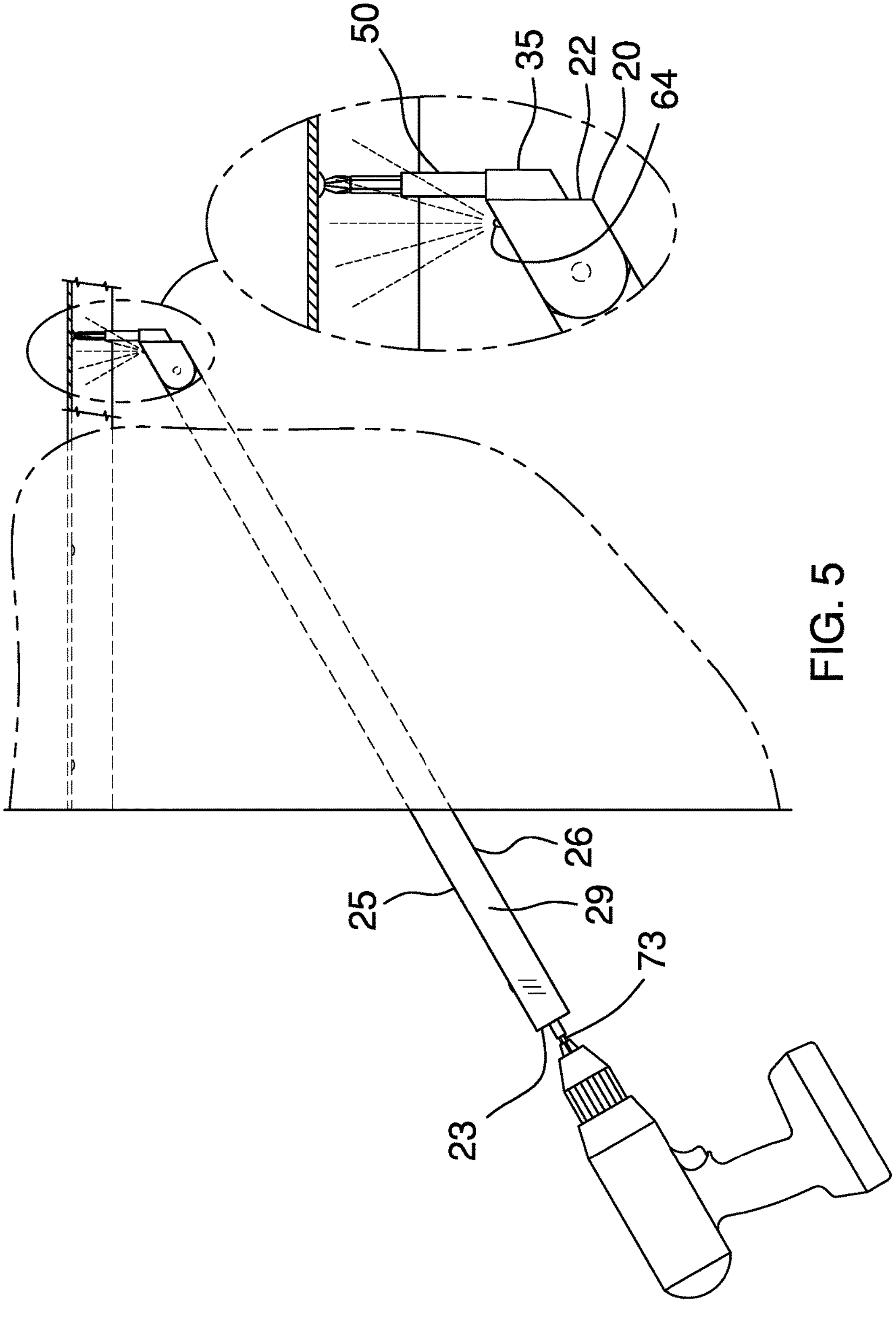

FIG. 5 is an in-use isometric view,

DETAILED DESCRIPTION OF THE DRAWINGS

With reference now to the drawings, and in particular FIGS. 1 through 5 thereof, an example of the instant pocket door repair tool employing the principles and concepts of the present pocket door repair tool and generally designated by the reference number 10 will be described.

Referring to FIGS. 1 through 5, the present pocket door repair tool 10 is illustrated. The pocket door repair tool 10 includes a hollow housing body 20. The housing body 20 has a front side 22, a rear side 23, a top side 25, a bottom side 26, a right side 28, a left side 29, and a cavity 30 continuously disposed within the housing body 20. A hollow drill bit holder housing 35 has a right end 37, a left end 38, a bottom end 40, a top end 41, a front end 43, a rear end 44 pivotably disposed on the front side 22 of the housing body 20 proximal the top side 25 through the right end 49 and the left end 38. A magnetic drill bit holder 50 is disposed on the front end 43 of the drill bit holder housing 35. The drill bit holder 50 is configured to magnetically secure a drill bit 51 thereto. A lockable screw 53 is pivotably attached to the rear end 44 of the drill bit holder 50 and the front side 22 of the housing body 20 proximal the bottom side 26 through the right end 37 and the left end 38. The lockable screw 53 is selectively, releasably lockable into one of a plurality of positions. The locking of the lockable screw 53 into a respective one of the plurality of positions is configured to secure the drill bit holder housing 35 into a respective one of a plurality of angles in a range of up to 90 degrees relative the front side 22 of the housing body 20.

A battery compartment 60 housing a battery 61 is disposed within the cavity 30 proximal the front side 22 of the housing body 20. An on-off switch 62 is disposed within the cavity 30 proximal the battery compartment 60. A light emitting diode 64 is provided to illuminate an area being drilled with the drill bit 51 upon activation of the on-off switch 62. The light emitting diode 64 has a first end 66 partially disposed within the drill bit holder housing 35 proximal the rear end 44 and a lens 68 through the top end 41. The light emitting diode 64, the on-off switch 62, and the battery 61 are in operational communication with each other.

A flexible driver drive shaft 70 is continuously disposed through the cavity 30 and the drill bit holder housing 35. The driver drive shaft 70 has a forward end 71 in operational communication with the drill bit 51 and a rearward end 73 operationally engageable to a power driver.

The inventor claims:

1. A pocket door repair tool comprising:

a hollow housing body having a front side, a rear side, a top side, a bottom side, a right side, a left side, and a cavity continuously disposed within the housing body;

a hollow drill bit holder housing having a right end, a left end, a bottom end, a top end, a rear end pivotably disposed on the front side of the housing body proximal the top side through the right end and the left end, and a front end, a magnetic drill bit holder disposed on the front end of the drill bit holder housing in a position perpendicular to the front end, the drill bit holder configured to magnetically secure a drill bit thereto;

a lockable screw pivotably attached to the rear end of the drill bit holder and the front side of the housing body proximal the bottom side through the right end and the left end, wherein the lockable screw is selectively, releasably lockable into one of a plurality of positions, wherein the locking of the lockable screw into a respective one of the plurality of positions is configured to secure the drill bit holder housing into a respective one of a plurality of angles in a range of up to 90 degrees relative the front side of the housing body;

a battery compartment housing a battery is disposed within the cavity proximal the front side of the housing body;

an on-off switch disposed within the cavity proximal the battery compartment;

a light emitting diode having a first end partially disposed within the drill bit holder housing proximal the rear end and a lens through the top end, the light emitting diode, the on-off switch, and the battery being in operational communication with each other, the light emitting diode being configured to illuminate an area being drilled with the drill bit upon activation of the on-off switch;

a flexible driver drive shaft continuously disposed through the cavity and the drills bit holder housing, the driver drive shaft having a forward end in operational communication with the drill bit and a rearward end, the rearward end being operationally engageable to a power driver.

* * * * *